Jan. 2, 1951 H. GOLDBERG ET AL 2,536,804

DELAYED PULSE CIRCUIT ARRANGEMENT

Filed June 29, 1945 2 Sheets-Sheet 1

INVENTOR.
GLENN H. MILLER
HAROLD GOLDBERG
BY
D. Clyde Jones
ATTORNEY

DELAYED PULSE CIRCUIT ARRANGEMENT

Filed June 29, 1945 2 Sheets-Sheet 2

INVENTOR.
GLENN H. MILLER
HAROLD GOLDBERG

BY

D. Clyde Jones
ATTORNEY

Patented Jan. 2, 1951 2,536,804

UNITED STATES PATENT OFFICE 2,536,804

DELAYED PULSE CIRCUIT ARRANGEMENT

Harold Goldberg, Baltimore, Md., and Glenn H. Miller, Rochester, N. Y., assignors to Stromberg-Carlson Company, Rochester, N. Y., a corporation of New York Application June 29, 1945, Serial No. 602,256

12 Claims. (Cl. 250—36)

The present invention relates to a circuit arrangement which generates a pulse, delayed for a controllable time interval with respect to a triggering pulse, the delay interval being a function of a voltage introduced into the circuit. This introduced voltage may be a fixed voltage, or it may be the output of an audio amplifier to which speech or music has been applied. While the present arrangement is particularly adapted for use in a pulse-time-modulation system, its use is not confined to that field of application alone.

There have been many systems in the past for obtaining a trigger pulse delayed from another trigger pulse, wherein the delay is a function of a control voltage. However, nearly all of these systems have been derivatives of multivibrator networks in combination with differentiating and sharpener circuits, and they all have the characteristic that the maximum delay time cannot much exceed 75% of the triggering period, where the circuit is periodically triggered. Furthermore, when the delay is voltage controlled, the minimum delay is usually in excess of 25% of the triggering period if the maximum delay is 75% of the triggering period. Thus, in a pulse time modulation system, a maximum deviation of plus or minus 25% of the repetition period is all that can be obtained.

The circuit arrangement of the present invention can theoretically give a delay interval ranging from zero to the full triggering period. Practically, since the initiating trigger pulse is finite in width, a range as wide as this is not achieved, but 90% of the triggering period can be obtained. In pulse-time modulation service employing the present invention, it has been possible to obtain a deviation of plus and minus 45% of the repetition period. However, plus and minus 50% is theoretically 100% modulation for pulse time modulation and this circuit can easily approach 90% modulation as compared to 50% modulation with other circuits. In addition, the delay in the present arrangement is essentially a linear function of the control voltage.

The various features and advantages of the present invention will appear from the detailed description and claims when taken with the drawings in which:

Figure 1:
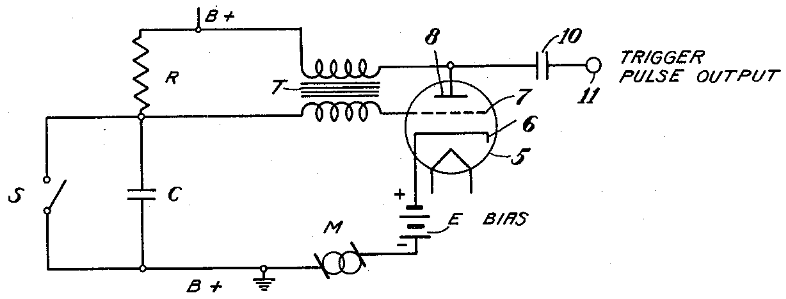
Fig. 1 is a circuit diagram of the present pulse generating arrangement in idealized form for simplicity in description.

In idealized form, as illustrated in Fig. 1, the present delay circuit consists of a free running clocking oscillator, otherwise known as a transformer-coupled relaxation oscillator, with a resistor R and a condenser C connected as shown and having a switch S connected across the terminals of the condenser. The oscillator includes the vacuum tube 5 provided with the indirectly heated cathode 6, the grid 7 and the anode 8. The cathode and the grid are connected in an input circuit including in series therewith, a source E of biasing voltage and a generator M as well as the condenser C and a winding of the transformer T. The anode 8 is connected in an anode circuit including another winding of the transformer T and a source of anode potential B. The source B of the anode circuit is also connected through the resistor R to a point on the input circuit between the condenser C and the related transformer winding. While a single source of potential is shown for both anode and charging, separate sources may be employed. With switch S open, the circuit operates as a free running blocking oscillator, but with switch S closed, the circuit is quiescent. In the action of the blocking oscillator, the condenser C is charged negatively during the period of oscillation, the negative charge being applied to the grid 7 to stop the oscillator from oscillating. Condenser C then charges in the positive sense. When the voltage on the grid 7 reaches the so-called "firing" value, the oscillator goes through another cycle of oscillation which again charges the condenser negatively. With each cycle of oscillation, a pulse is transmitted through the condenser 10 and output terminal 11.

Figure 2:
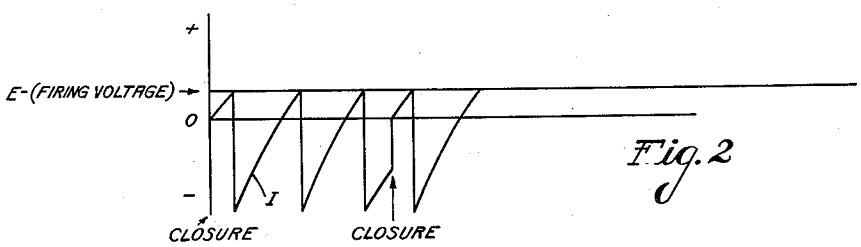
Figs. 2, 3, 4, 5, 6 and 7 are curves useful in explaining the invention.
Figure 3:
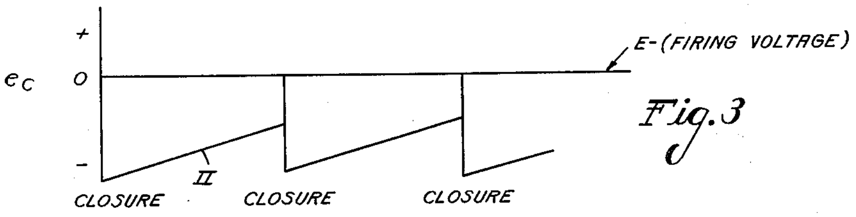
Figure 4:
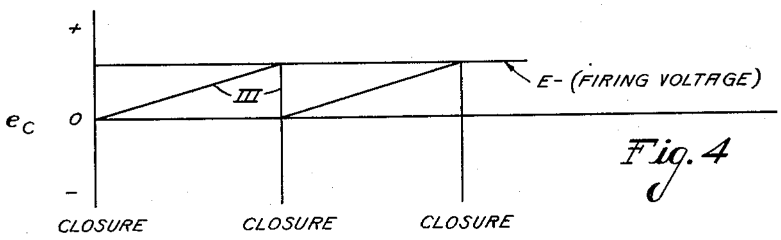
Figure 5:
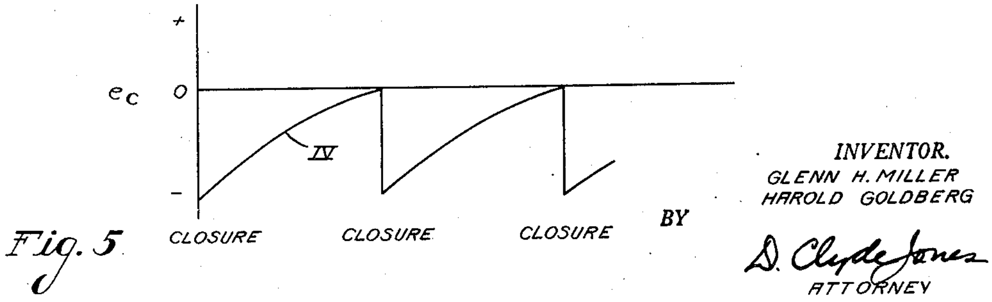
Figure 6:
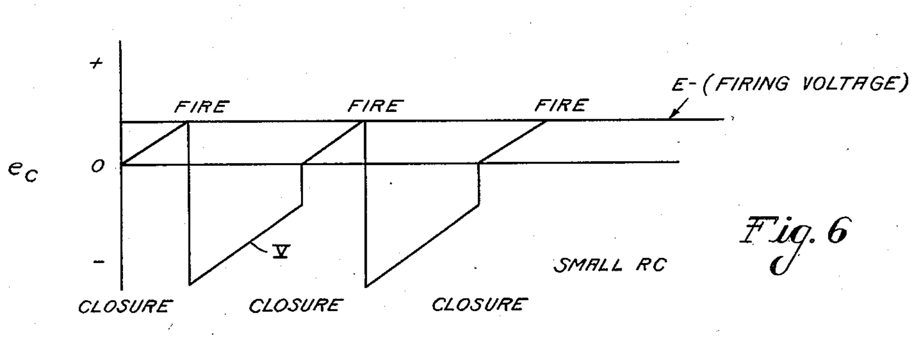
Figure 7:
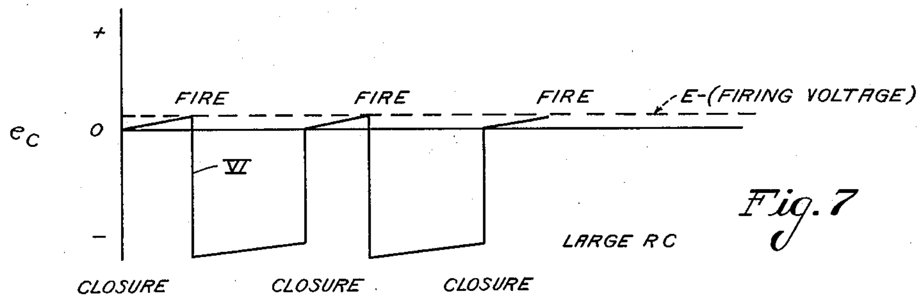

In the operation of this arrangement, triggering the circuit corresponds to momentarily closing the switch S which results in the discharge of condenser C. Let it be assumed that the momentary closure of S takes place periodically with period T. If the voltage of generator M is zero, and if the proper adjustment of voltage E as well as of the product RC is made, the circuit will "fire" once each period and at some time during the period which is a function both of voltage E and the product RC of the resistor and condenser. For example, if voltage E is adjusted so that the vacuum tube 5 is just on the verge of "firing" when the voltage across condenser C is zero, as shown by curve I of Fig. 2, this tube will fire almost immediately after the momentary closure of switch S. If the voltage E is increased from this value, the firing time will be progressively delayed. The function of the product RC is somewhat more complicated. Product RC must have such a value that it will be large enough to prevent the circuit from firing more than once per period. The circuit sensitivity, that is, the time delay per volt change in E, will be greatest when product RC is at its maximum permissible value. In order to understand the influence of the RC product value, consider the case where RC is small relative to the period. As condenser C charges after a momentary closure, the firing voltage is reached and the tube fires. This charges condenser C to a large negative voltage which cuts off the tube 5. Condenser C immediately starts to discharge and eventually reaches the firing voltage at which time the cycle of negative charge and discharge begins again. As the time constant or product RC is increased, for a given repetition period and value of E, the following events occur, depending on the value of E. First, the number of firings per period will decrease as the product RC is increased. Eventually, the time constant RC will have such a value that only one firing per period occurs. If the RC product is increased beyond this value, the tube 5 may continue to fire once per period or may cease to fire at all. If the tube 5 has ceased to fire at all and if E is at a voltage which is higher than the firing voltage of the blocking oscillator circuit, the circuit may again be made to fire once per period by lowering the voltage E. E may not be made less than the firing voltage since the circuit is completely out of control under this condition. The lowest permissible value of RC is that value which gives one firing per period when E is just slightly greater than the firing voltage. In this condition, the circuit is in its least sensitive state. As the RC product is increased, the sensitivity of the circuit increases, that is, the delay per volt increase in E increases, as will be illustrated. The only limit to increasing the value RC indefinitely is that at great sensitivity the circuit will be influenced by extraneous and internal variations and will become unstable. The curves in Figs. 2 to 7 inclusive illustrate the condenser voltage under several different conditions. Curve I of Fig. 2 indicates the condenser voltage under the condition of more than one firing per period. Curve II of Fig. 3 shows the condenser voltage condition for one firing per period, with minimum delay. Curve III of Fig. 4 shows a condition similar to that of curve II for one firing per period but with maximum delay. Curve IV of Fig. 5 shows the condenser voltage condition for determining lowest permissible value of the product RC. Curve V of Fig. 6 shows the condenser voltage condition of medium delay with low sensitivity, and curve VI of Fig. 7 shows the condition of some delay with high sensitivity.

In the earlier portion of this description the function of the generator M, was not set forth. Generator M is used where it is desirable to have source E give a fixed delay (a bias) and M is then a variable voltage which is used to vary the delay with respect to the value fixed by source E. In pulse time modulation, voltage E is set to give a delay equal to one half the repetition period. An audio voltage represented by generator M, according to the audio signal impressed, varies the delay above and below the value set by voltage E.

Figure 8:
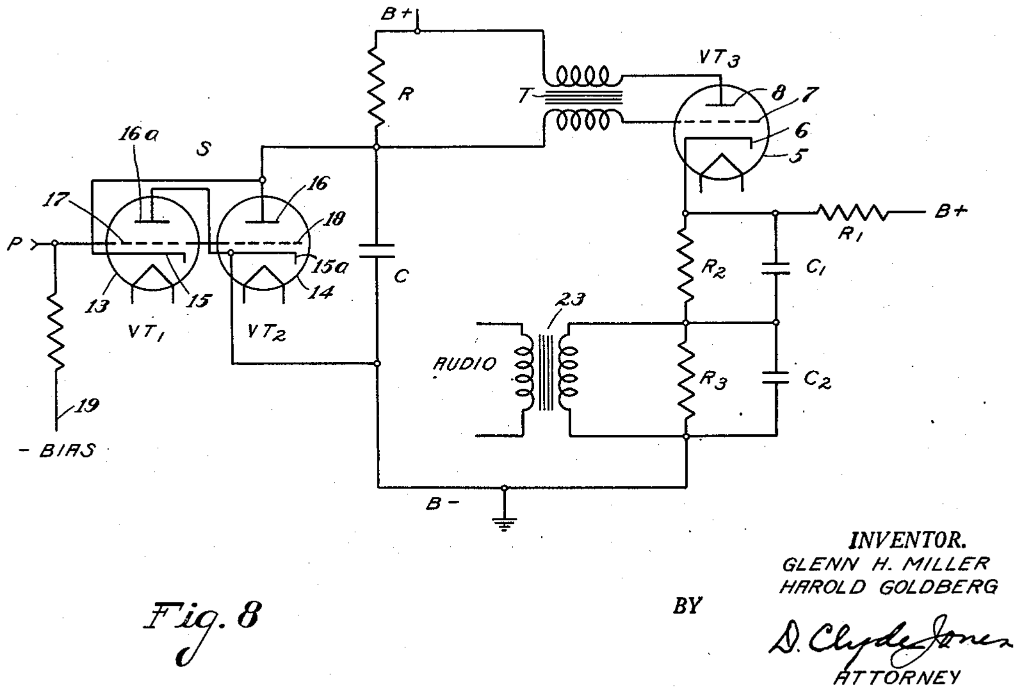
Fig. 8 is a circuit diagram of the invention in practical form.

In the practical form of the invention, illustrated in Fig. 8, the switch S of Fig. 1 has been replaced by an electronic switch, and generator M has been replaced by a transformer by means of which an audio signal can be introduced into the network. The electronic switch comprises the two vacuum tubes 13 and 14 with the cathode 15 of tube 13 connected in multiple with the anode 16 of tube 14. Similarly, the cathode 15a of tube 14 is connected in multiple with the anode 16a of tube 13. The grids 17 and 18 of these tubes are permanently connected to a source of negative bias 19 which normally biases the grids 17 and 18 to the value where the tubes 13 and 14 are cut off. This is equivalent to opening the switch S in Fig. 1. The mentioned grids 17 and 18 are also connected to a pulse source P which periodically applies a positive pulse to these grids for rendering the tubes 13 and 14 conducting for the duration of each pulse, after the manner of closing switch S. It should be pointed out that the two vacuum tubes 13 and 14, connected in the manner shown, are used to permit condenser C to discharge regardless of the polarity of charge on it. The voltage, corresponding to "E bias" (Fig. 1), is applied from source B+ by means of the network including resistors $R_1$ and $R_2$, and the bypass condenser $C_1$. The modulating or audio voltage designated "audio" and corresponding to generator M of Fig. 1, is applied by means of the audio transformer 23 and the network including resistor $R_3$ and condenser $C_2$. The function of condensers $C_1$ and $C_2$ is to bypass the charging current of condenser C during the firing interval. Condenser $C_2$ can be made of such value that it performs this function without bypassing the audio voltage appreciably. Resistor $R_3$ is the terminating load for the audio transformer 23.

What we claim is:

1. In a time-delay pulse generator, an oscillator comprising a vacuum tube having a cathode, a grid, and an anode, an input circuit for said oscillator connecting said cathode and said grid and having a capacitor and a source of bias connected therein, said capacitor being connected such that said capacitor is charged negatively with respect to said grid during periods of oscillation of said tube until said tube is rendered non-conductive, an output circuit for said oscillator coupled to said input circuit, said output circuit including said anode and a source of anode potential, a source of positive potential, a resistor, means including said resistor for connecting said source of positive potential to the grid side of said capacitor for charging said capacitor in the positive direction during the non-conductive periods of said tube, and additional means for discharging said capacitor upon termination of the period of charge in said positive direction.

2. In a time-delay pulse generator, an oscillator comprising a vacuum tube having a cathode, a grid, and an anode, an input circuit for said oscillator connecting the cathode and said grid and having a capacitor and a source of bias connected therein, said capacitor being connected such that said capacitor is charged negatively with respect to said grid during periods of oscillation of said tube until said tube is rendered non-conductive, an output circuit for said oscillator transformer-coupled to said input circuit, said output circuit including said anode and a source of anode voltage, a source of positive electromotive force, a resistor, means including said resistor for connecting said positive source to the grid side of said capacitor for charging said capacitor in the positive direction during the non-conductive periods of said tube, and additional means for discharging said capacitor upon termination of the period of charge in the positive direction.

3. In an arrangement for developing delayed pulses, an oscillator comprising a vacuum tube provided with a cathode, a grid and an anode, an input circuit for said oscillator connecting the cathode and said grid and having a capacitor and a source of cathode bias connected therein, said capacitor being connected such that said capacitor is charged negatively until said tube is rendered non-conductive, an output circuit for said oscillator transformer-coupled to said input circuit, said output circuit including said anode and a source of anode voltage, a pulse terminal connected to said output circuit, a source of positive electromotive force, a resistor through which said positive source is connected to said capacitor for charging said capacitor in the positive direction, and separate means comprising a periodically operated electronic switch for discharging said capacitor upon termination of the period of charge in the positive direction.

4. In an arrangement of the class described, an oscillator comprising an electron discharge device provided with a cathode, a grid and an anode, an input circuit for said oscillator connecting the cathode and said grid and having a capacitor and a source of cathode bias connected therein, said capacitor being connected such that said capacitor is charged negatively until said tube is rendered non-conductive, an output circuit for said oscilator coupled to said input circuit, said output circuit including said anode and a source of anode voltage, a pulse terminal connected to said output circuit, a source of positive electromotive force, a resistor through which said positive source is connected to said capacitor for charging said capacitor in the positive direction, means including a switch for discharging said capacitor upon termination of the period of charge in the positive direction, said switch comprising two electron discharge tubes, each provided with a cathode, a grid and anode, an anode of one tube and the cathode of the other tube being connected in multiple to one terminal of said capacitor, the remaining anode and cathode of said tubes being connected in mulitple to the other terminal of said capacitors, the grids of said tubes being normally biased to render said tubes non-conducting, and means for applying positive pulses to said grids whereby said tubes are intermittently rendered conducting.

5. In an arrangement of the class described, an oscillator comprising an electron discharge device provided with a cathode, a grid and an anode, an input circuit for said oscillator connecting the cathode and said grid and having a capacitor and a source of cathode bias connected therein, an output circuit for said oscillator coupled to said input circuit, said output circuit including said anode and a source of anode voltage, a pulse terminal connected to said output circuit, a source of positive electromotive force, a resistor through which said positive source is connected to said capacitor, means for introducing a modulating signal into said input circuit, means including a switch for discharging said capacitor, said switch comprising two electron discharge tubes, each provided with a cathode, a grid and anode, an anode of one tube and the cathode of the other tube being connected in multiple to one terminal of said capacitor, the remaining anode and cathode of said tubes being connected in multiple to the other terminal of said capacitor, the grids of said tubes being normally biased to render said tubes non-conducting, and means for applying positive pulses to said grids whereby said tubes are intermittently rendered conducting.

6. In a pulse generator, a vacuum tube oscillator, said tube having an anode, a cathode and a grid, a source of bias for said oscillator, a pulse output circuit coupled to said oscillator, means including a capacitor charged negatively in response to the operation of said oscillator to a value sufficiently negative to cut off operation of said oscillator, a source of input pulses, means utilizing said input pulses for discharging said capacitor, and a source of potential for thereafter charging said capacitor through a resistor in the positive direction to a value sufficient to cause said oscillator to resume operation a predetermined time after the receipt of an input pulse depending upon the time constant of said resistor and capacitor, the least permissible value of time constant being that value which produces one operation of said oscillator for each input pulse when said bias is such as to maintain said cathode at a potential slightly more positive than said grid in the uncharged condition of said capacitor.

7. In a pulse generator, an oscillator comprising a vacuum tube provided with a cathode, a grid and an anode, an input circuit for said oscillator connecting the cathode and said grid, and having a capacitor and a source of bias connected therein, said capacitor being connected to be charged in the negative direction until said tube is rendered non-conducting, an output circuit for said oscillator coupled to said input circuit, said output circuit including said anode and a source of anode potential, a pulse terminal connected to said output circuit, a source of positive potential, a resistor through which said source of positive potential is connected to said capacitor for charging said capacitor in the opposite direction, and separate means for discharging said capacitor upon termination of the recharging period in the positive direction, the amount and sense of said bias being such that said cathode is at a potential slightly more positive than said grid in the uncharged condition of said capacitor.

8. In a pulse generator, an oscillator comprising a vacuum tube provided with a cathode, a grid and an anode, an input circuit for said oscillator connecting the cathode and said grid, and having a capacitor and a source of bias connected therein, said capacitor being connected to be charged in the negative direction until said tube is rendered non-conducting, an output circuit for said oscillator coupled to said input circuit, said output circuit including said anode and a source of anode potential, a pulse terminal connected to said output circuit, a source of positive potential, a resistor through which said source of positive potential is connected to said capacitor for charging said capacitor in the opposite direction, separate means for discharging said capacitor upon termination of the recharging period in the positive direction, the amount and sense of said bias being such that said cathode is at a potential slightly more positive than said grid in the uncharged condition of said capacitor, and a source of reference pulses, said bias being of such value and sense as to give a delay in operation of said blocking oscillator equal to one-half the repetition rate of said reference pulses.

9. In a pulse generator, an oscillator comprising a vacuum tube provided with a cathode, a grid and an anode, an input circuit for said oscillator connecting the cathode and said grid, and having a capacitor and a source of bias connected therein, said capacitor being connected to be charged in the negative direction until said tube is rendered non-conducting, an output circuit for said oscillator coupled to said input circuit, said output circuit including said anode and a source of anode potential, a pulse terminal connected to said output circuit, a source of positive potential, a resistor through which said source of positive potential is connected to said capacitor for charging said capacitor in the opposite direction, separate means for discharging said capacitor upon termination of the recharging period in the positive direction, the amount and sense of said bias being such that said cathode is at a potential slightly more positive than said grid in the uncharged condition of said capacitor, and a source of input pulses, the amount and sense of said bias and the time constant of said blocking oscillator determining the duration of the period between the receipt of each input pulse and the next operation of said oscillator to produce output pulses.

10. In an arrangement of the class described, an oscillator comprising a vacuum tube provided with a cathode, a grid and an anode, an input circuit for said oscillator connecting the cathode and said grid and having a capacitor and a source of bias connected therein, said capacitor being connected such that said capacitor is charged negatively with respect to said grid until said tube is rendered non-conductive, an output circuit for said oscillator coupled to said input circuit, said output circuit including said anode and a source of anode potential, a source of positive potential, a resistor through which said source of positive potential is connected to the grid side of said capacitor for charging said capacitor in the positive direction, and separate means for discharging said capacitor upon termination of the period of charge in the positive direction, said bias including a source of variable voltage whereby said period varies in accordance with said variable voltage.

11. In a variably delayed pulse generator, the combination of: an electron discharge device having a control electrode, a cathode, and an anode; a transformer having first and second windings; a capacitor; a source of bias potential; a source of modulating potential; a series circuit comprising said first winding, said capacitor, said modulating-potential source, and said bias-potential source sequentially connected between said control electrode and said cathode; a source of unidirectional potential having its negative terminal connected to the junction of said capacitor and said modulating-potential source; a connection including said second winding between said anode and the positive terminal of said unidirectional potential source; and a resistive element connected between said positive terminal and the junction of said first winding and said capacitor.

12. In a variably delayed pulse generator, the combination of: an electron discharge device having a control electrode, a cathode, and an anode; a transformer having first and second windings; a capacitor shunted by electronic switching means; a source of bias potential; a source of modulating potential; a series circuit comprising said first winding, said capacitor, said modulating-potential source and said bias-potential source sequentially connected between said control electrode and said cathode; a source of unidirectional potential having its negative terminal connected to the junction of said capacitor and said modulating-potential source; a connection including said second winding between said anode and the positive terminal of said unidirectional potential source; and a resistive element connected between said positive terminal and the junction of said first winding and said capacitor.

HAROLD GOLDBERG.
GLENN H. MILLER.

REFERENCES CITED

The following references are of record in the file of this patent:

UNITED STATES PATENTS

| Number | Name | Date |
|---|---|---|
| 2,165,815 | Rhea | July 11, 1939 |
| 2,188,653 | Faudell et al. | Jan. 31, 1940 |
| 2,212,202 | Faudell et al. | Aug. 20, 1940 |
| 2,292,835 | Hepp | Aug. 11, 1942 |
| 2,293,135 | Hallmark | Aug. 18, 1942 |
| 2,323,596 | Hansell | July 6, 1943 |
| 2,327,791 | Hopper | Aug. 24, 1943 |
| 2,358,297 | Bedford | Sept. 19, 1944 |
| 2,398,097 | Kent | Apr. 9, 1946 |
| 2,424,274 | Hansell | July 22, 1947 |

FOREIGN PATENTS

| Number | Country | Date |
|---|---|---|
| 235,254 | Great Britain | June 11, 1925 |